United States Patent [19]

Noguchi et al.

[11] Patent Number: 4,809,112

[45] Date of Patent: Feb. 28, 1989

[54] BACK CORE HOLDING CLIP DISPOSED ON INTERIOR SIDE OF BACK CORE

[75] Inventors: Ichiro Noguchi, Nagaoka; Shoichi Koyama, Horinouchi, both of Japan

[73] Assignee: Alps Electric Co., Ltd., Japan

[21] Appl. No.: 6,937

[22] Filed: Jan. 27, 1987

[30] Foreign Application Priority Data

Apr. 11, 1986 [JP] Japan .............................. 61-54550[U]

[51] Int. Cl.$^4$ ............................ G11B 5/10; G11B 5/12
[52] U.S. Cl. .................................... 360/125; 360/121; 360/129
[58] Field of Search ................. 360/122, 125, 129, 121

[56] References Cited

U.S. PATENT DOCUMENTS 3,548,393 12/1970 Montel .............................. 360/129 X
4,012,783 3/1977 Hanaoka .............................. 360/125
4,152,742 5/1987 Kronfeld .............................. 360/125

Primary Examiner—John H. Wolff
Attorney, Agent, or Firm—Guy W. Shoup; Paul J. Winters; David W. Heid

[57] ABSTRACT

A back core fixing structure of magnetic head is provided, in which a back core is fixed to magnetic cores in such a manner that a holding member provided with a resilient tongue segment having pinching power is attached to the open end on the opposite side of a pair of magnetic cores to the confronting side facing opposite a magnetic medium with the resilient tongue segment opened on the side of the open end, and the back core is fitted in the space between the magnetic cores and the resilient tongue segment, whereby position adjustment of the back core is achieved easily and fixing work is simplified and can be automated.

3 Claims, 3 Drawing Sheets

BACK CORE HOLDING CLIP DISPOSED ON INTERIOR SIDE OF BACK CORE

BACKGROUND OF THE INVENTION

1. Field of the Invention

This invention relates to an improvement of a structure of fixing a back core, forming a closed magnetic circuit by being positioned at an open end of a pair of magnetic cores defining a magnetic gap, to the magnetic cores.

2. Description of the Prior Art

A conventional back core fixing structure of magnetic head is shown in FIG. 5. This fixing structure is of the type applied to a combined type magnetic head. The combined type magnetic head is composed of a recording/reproducing magnetic head core assembly 11 and an erase magnetic head core assembly 21 coupled together via a non-magnetic substance 31, such as ceramics or glass. The recording/reproducing magnetic head core assembly 11 or the erase magnetic head core assembly 21 is composed of a pair of magnetic cores 12 and 13 or of a pair of magnetic cores 22 and 23 joined together, and a space between the magnetic cores of either pair defines a recording/reproducing gap 10 or an erase gap 20. Within the space of either the recording/reproducing gap 10 or the erase gap 20 is interposed a non-magnetic material such as glass of high melting point. The erase gap 20 is for creating no-record bands on either side of a recording track recorded by the recording/reproducing gap 10.

The core 13 of the recording/reproducing magnetic head core assembly or the core 23 of the erase magnetic head core assembly has a coil bobbin 15 or 25 fitted thereon, and the coil bobbin 15 or 25 has a coil 16 or 26 wound therearound. FIG. 5 shows only one set of bobbin and coil. Sliders 35 and 35 are joined to either side of the recording/reproducing magnetic core assembly 11 and erase magnetic core assembly 21.

A back core 41 is joined to both the magnetic cores 12 and 13 and to both the magnetic cores 22 and 23. This back core 41 is formed into the shape of a single body by magnetic materials 43 and 44 joined together with interposition of non-magnetic material 42 therebetween, and the non-magnetic material 42 corresponds to the non-magnetic substance 31 interposed between the joined portions of the magnetic core 12 and the magnetic core 22. The back core 41 is joined to one side surface of the open end, i.e. of the opposite side of the recording/reproducing magnetic head core assembly 11 and erase magnetic head core assembly 21 to the confronting side facing opposite a magnetic medium, and to achieve such joining, a holding member 51 is used. This holding member 51 has an L-shaped face section 52 held in contact with the open end surface and one side surface of the recording/reproducing magnetic head core assembly 11 and erase magnetic head core assembly 21, and a pair of resilient tongue segments 53 having pinching power which extend downward in the drawing from edge portions of the face section 52. After the back core 41 is disposed at a predetermined position, i.e. on one side surface of the open end of the recording/reproducing magnetic head core assembly 11 and erase magnetic head core assembly 21 and the non-magnetic material 42 is aligned in position with the non-magnetic substance 31, the back core 41 is attached so as to cover the back core 41 from the open end of the recording/reproducing magnetic head core assembly 11 and erase magnetic head core assembly 21, and is fixed to the recording/reproducing magnetic head core assembly 11 and the erase magnetic head core assembly 21 by means of the pinching power of the resilient tongue segments 53. The fixing of the back core 41 to the recording/reproducing magnetic head core assembly 11 and the erase magnetic head core assembly 21 may be achieved by the use of bond, such as adhesive or synthetic resin. As the back core 41 is fixed to the recording/reproducing magnetic head core assembly 11 and the erase magnetic head core assembly 21, a closed recording/reproducing magnetic circuit is formed by the magnetic cores 12 and 13 and the magnetic material 44, whereas a closed erase magnetic circuit is formed by the magnetic cores 22 and 23 and the magnetic material 43.

According to the conventional back core fixing structure described above, the back core 41 is disposed on the recording/reproducing magnetic head core assembly 11 and the erase magnetic head core assembly 21, and the holding member 51 is attached from above both the core assemblies in the drawing (from the side of the open end) with the point of each resilient tongue segment 53 being oriented toward the confronting surface side of the recording/reproducing magnetic head core assembly 11 and erase magnetic head core assembly 21 so as to pinch and fix the back core 41 to both the core assemblies. Thus, the holding member 51 covers the position setting portions of the non-magnetic material 42 and the non-magnetic substance 31, thereby making difficult fixing work. Further, if the pinching power of the resilient tongue segments 53 is weak, the joined state of the back core 41 is loose to influence the closed magnetic circuits. Furthermore, since the resilient tongue segments 53 extend from end portions of the face section 52, the pinching power of the resilient tongue segments 53 acts strongly on the magnetic cores 13 and 23, but weakly on the magnetic cores 12 and 22 to thereby weaken the joined state. Still more, in case the back core 41 is fixed by the use of bond, a long time is necessary for the bond to solidify, thus, a different holding jig must be used to keep the joined state until the bond solidifies. In addition, since the bond is interposed between the back core 41 and the recording/reproducing magnetic head core assembly 11 and erase magnetic head core assembly 21, there is involved the problem that some loss is created in each magnetic circuit and the like.

SUMMARY OF THE INVENTION

It is an object of the present invention to provide a back core fixing structure which simplifies fixing work, makes easy position adjustment, and permits automatization of the fixing work.

According to the present invention, a back core is fixed to magnetic cores in such a manner that a holding member provided with a resilient tongue segment having pinching power is attached to the open end on the opposite side of a pair of magnetic cores to the confronting side facing opposite a magnetic medium with the resilient tongue segment opened on the side of the open end, and the back core is fitted in the space between the magnetic cores and the resilient tongue segment.

DESCRIPTION OF THE PREFERRED EMBODIMENTS

Figure 4:
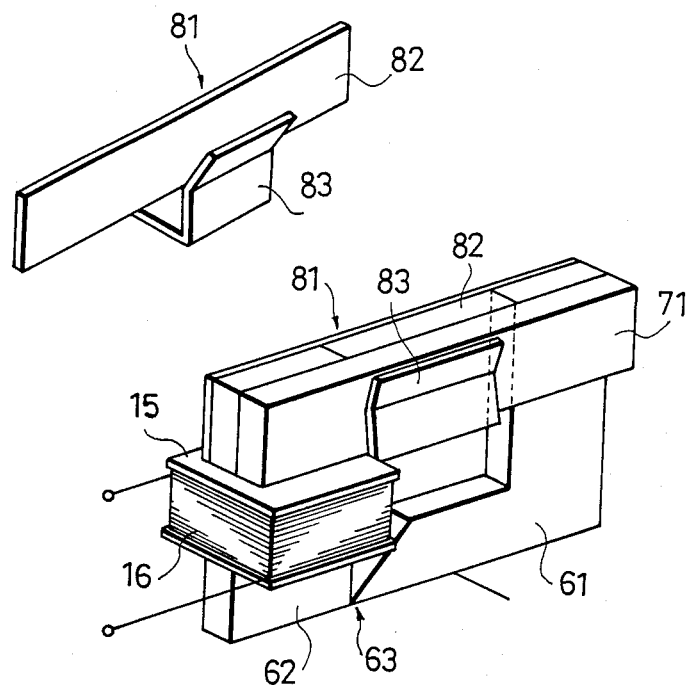
FIG. 4 is an exploded perspective view of a second embodiment of the present invention.
Figure 5:
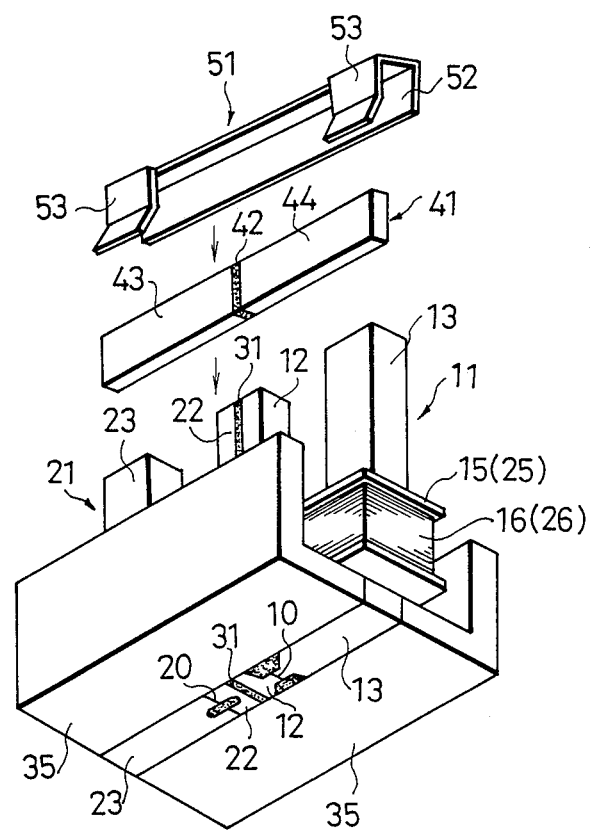
FIG. 5 is an exploded perspective view of a conventional back core fixing structure of magnetic head.

Embodiments of the present invention will now be described with reference to FIGS. 1 through 4, in which the equivalent components to those of FIG. 5 are designated by the same reference numerals as in FIG. 5.

Figure 1:
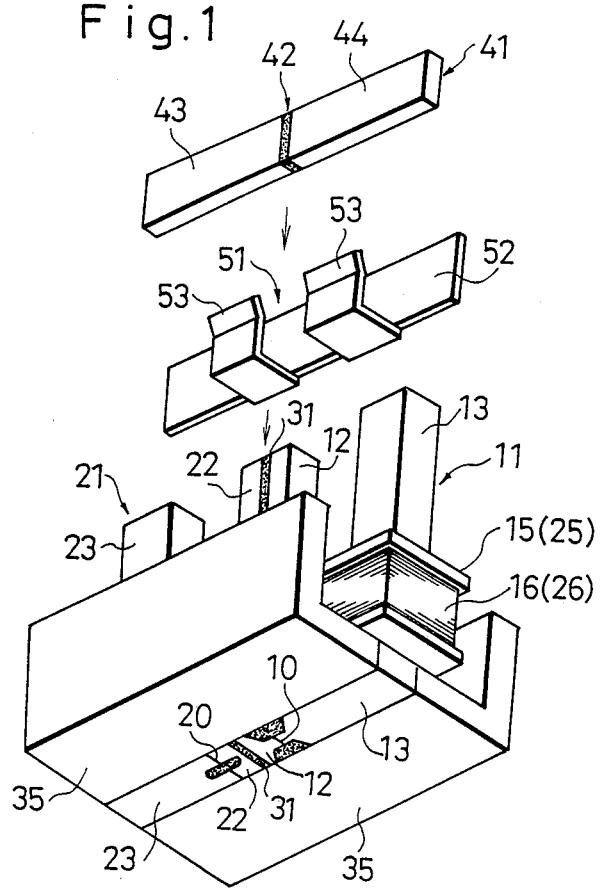
FIG. 1 is an exploded perspective view of a first embodiment of a back core fixing structure of magnetic head according to the present invention.
Figure 2:
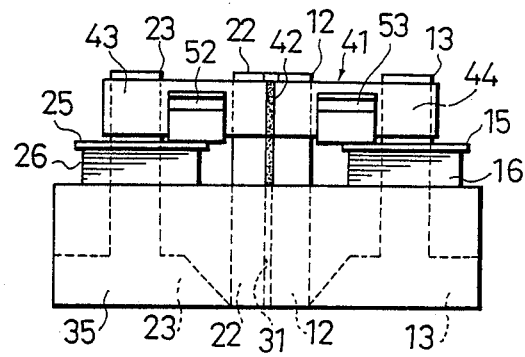
FIG. 2 is a front view showing the fixed state of the structure of FIG. 1.
Figure 3:
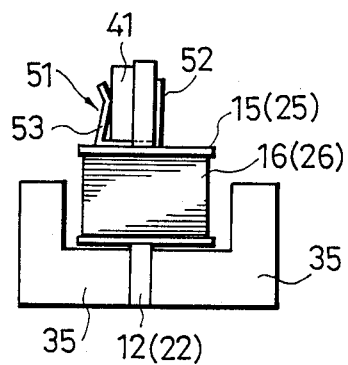
FIG. 3 is a side view corresponding to FIG. 2.

FIGS. 1 through 3 show a first embodiment of the present invention. This embodiment is of the type in which a holding member 51 is applied to a combined type magnetic head. The holding member 51 has a pair of resilient tongue segments 53. The feature of the present invention is that the holding member is used with orienting the points of these resilient tongue segments 53 upward in the drawing, i.e. toward the open end of a recording/reproducing magnetic head core assembly 11 and an erase magnetic head core assembly 21. These resilient tongue segments 53 are formed at inner positions spaced from the ends of a face section 52, and the width of each segment is dimensioned so as to be inserted in between magnetic cores 22 and 23 or between magnetic cores 12 and 13. Further, the spacing between the resilient tongue segments 53 and 53 is set to a length larger than the joined width of the magnetic cores 12 and 22.

The fixing process of a back core 41 to the recording/reproducing magnetic head core assembly 11 and erase magnetic head core assembly 21 by the use of the aforementioned holding member 51 will now be described. Under the condition that the points of the resilient tongue segments 53 of the holding member 51 are looking upward, the coupled portion of the magnetic cores 12 and 22 is passed through between the resilient tongue segments 53 and 53, the holding member 51 is disposed on a bobbin 15, and the face section 52 is made to abut on one side surface of the recording/reproducing magnetic head core assembly 11 and erase magnetic head core assembly 21. As a result, a space is left between the inside surface of the resilient tongue segments 53 and the other side surface of the magnetic head core assemblies 11 and 21 in which space the back core 41 is inserted. As the back core 41 is inserted from the above into the aforementioned space, the back core 41 is pressed against the recording/reproducing magnetic head core assembly 11 and erase magnetic head core assembly 21 by means of the pinching power of the resilient tongue segments 53, thereby being secured in place. At the time of insertion of the back core 41, its non-magnetic material 42 must be positioned in relation to a non-magnetic substance 31 interposed between the magnetic cores 12 and 22; but, because it is possible to confirm the portions to be joined of the non-magnetic material 42 and the non-magnetic substance 31 through looking from the above, position adjustment of the above two is simple and fixing work is achieved easily. Further, since the pair of resilient tongue segments 53 faces opposite the portions between the magnetic cores 12 and 13 and between the magnetic cores 22 and 23, the pinching power of the resilient tongue segments 53 acts substantially uniformly on the back core 41, and the back core 41 is joined surely also with the coupled portion of the magnetic cores 12 and 22, whereby a good fixed state results.

FIG. 4 shows a second embodiment of the present invention. This embodiment is of the type applied to a unitary type magnetic head. This magnetic head is composed of an L-shaped core 61 and an I-shaped core 62, and a magnetic gap 63 is defined by these L-shaped core 61 and I-shaped core 62. The opposite side of the L-shaped core 61 and I-shaped core 62 to their confronting side facing opposite a magnetic medium is opened. A coil bobbin 15 is fitted on the I-shaped core 62, and a coil 16 is wound around this coil bobbin 15. By making a single back core 71 contact with both the L-shaped core 61 and the I-shaped core 62, a closed magnetic circuit is formed. In order to fix the back core 71 to the open end of the L-shaped core 61 and I-shaped core 62, a holding member 81 has a face section 82, and a single resilient tongue segment 83 having pinching power and formed at a central portion of the former, and the width of the resilient tongue segment 83 is set to such a length that it can be inserted in between the L-shaped core 61 and the I-shaped core 62. In assembling, while orienting the point of the resilient tongue segment 83 toward the open end of the L-shaped core 61 and I-shaped core 62, the under edge of the face section 82 is made to abut on the upper side of the coil bobbin 15 and the face section 82 on one side surface of the L-shaped core 61 and I-shaped core 62, and then, the back core 71 is put in the space between the inside surface of the resilient tongue segment 83 and the L-shaped core 61 and I-shaped core 62. As a result, the back core 71 is fixed to the L-shaped core 61 and the I-shaped core 62 by means of the pinching power of the resilient tongue segment 83.

As described above, according to the present invention, the resilient tongue segment of the holding member is oriented and opened toward the open end on the opposite side of the magnetic head core assembly to the confronting side facing opposite a magnetic medium, and the back core is fitted in from the side of the aforementioned open end, thus, position adjustment of the back core with respect to the magnetic head is achieved simply, and the fixing work is performed easily. Further, automatization of the fixing work which was hardly realized in the prior art becomes possible.

What is claimed is:

1. A back core holding clip for a magnetic head assembly having a pair of magnetic cores forming on one side of said assembly a magnetic gap for recording and reproducing on a magnetic medium placed horizontally in contact with said one side, said pair of cores having respective leg portions which are spaced apart in a first horizontal direction from each other and extend in parallel in a vertical direction to respective end portions thereof on another side of said assembly opposite from said one medium-contacting side, wherein one of said cores has a coil bobbin positioned on its leg portion, said end portions being spaced apart by a given spacing in the first horizontal direction from each other, and a back core in a bar shape extending in the first horizontal direction across said given spacing and having its ends each held in contact with one side surface of a respective end portion facing in a second horizontal direction perpendicular to the first horizontal direction, so that said back core forms a closed magnetic circuit with said magnetic cores, the improvement wherein said back core clip is formed with a face section in a bar shape, said face section having an upper edge and a lower edge, with said face section extending in the first horizontal direction across said given spacing in parallel with said back core and having its ends each abutted in contact with another side surface of a respective end portion facing in the second horizontal direction opposite from said one side surface against which a respective end of said back core is held and having said lower edge of said face section abutted against said coil bobbin, and at least one resilient tongue segment which is disposed at an intermediate position between said end portions and which extends from an interior side of said lower edge of said face section across said back core in the second horizontal direction to said back core and upward, whereby when the back core is depressed from above into the spacing formed by said magnetic cores and said resilient tongue segment said tongue segment clampingly abuts against a back side of said back core so as to clamp it toward said face section with said end portions of said legs pinched in between said back core and said face section, whereby said back core as positioned against said end portions of said leg portions is left exposed to be checked from said opposite side of said assembly.

2. A back core fixing structure of magnetic head according to claim 1, wherein there are two pairs of magnetic cores defining two magnetic gaps, and the holding member has two resilient tongue segments each disposed between a respective pair of magnetic cores.

3. A back core fixing structure of magnetic head according to claim 1, wherein the resilient tongue segment has a width smaller than the spacing between the paired magnetic cores, and is positioned at an offset position between the paired magnetic cores.

* * * * *